(12) United States Patent
Rau et al.

(10) Patent No.: US 11,565,382 B2
(45) Date of Patent: Jan. 31, 2023

(54) MOUNTING DEVICE AND METHOD FOR VALIDATABLE FIXING

(71) Applicant: Xenios AG, Heilbronn (DE)

(72) Inventors: Michael Rau, Bad Friedrichshall (DE); Sven Filipon, Heilbronn (DE)

(73) Assignee: XENIOS AG, Heilbronn (DE)

( * ) Notice: Subject to any disclaimer, the term of this patent is extended or adjusted under 35 U.S.C. 154(b) by 0 days.

(21) Appl. No.: 17/262,464

(22) PCT Filed: Jul. 4, 2019

(86) PCT No.: PCT/DE2019/000175
§ 371 (c)(1),
(2) Date: Jan. 22, 2021

(87) PCT Pub. No.: WO2020/020390
PCT Pub. Date: Jan. 30, 2020

(65) Prior Publication Data
US 2021/0220970 A1     Jul. 22, 2021

(30) Foreign Application Priority Data

Jul. 23, 2018   (DE) .................... 10 2018 005 743.8

(51) Int. Cl.
*B25B 11/00*  (2006.01)
*B65D 81/05*  (2006.01)
(Continued)

(52) U.S. Cl.
CPC ............ *B25B 11/007* (2013.01); *A47G 29/08* (2013.01); *B65D 81/05* (2013.01); *B60R 2011/0056* (2013.01); *B60R 2011/0068* (2013.01)

(58) Field of Classification Search
CPC ....... B25B 11/007; A47G 29/08; B65D 81/05; B60R 2011/0056; B60R 2011/0068
(Continued)

(56) References Cited

U.S. PATENT DOCUMENTS

| 4,497,476 A | * | 2/1985 | Wiele | C03C 27/10 |
| | | | | 269/21 |
| 5,728,258 A | * | 3/1998 | Chung | B29C 73/32 |
| | | | | 269/21 |

(Continued)

FOREIGN PATENT DOCUMENTS

| DE | 102007012889 A1 | 12/2007 |
| DE | 202010000448 U1 | 7/2010 |

(Continued)

OTHER PUBLICATIONS

International Search Report dated Nov. 4, 2019; International Application No. PCT/DE2019/000175.

*Primary Examiner* — Christopher Garft
(74) *Attorney, Agent, or Firm* — Dinsmore & Shohl LLP

(57) ABSTRACT

A mounting device for fastening a component, such as in particular a fixture, at a defined location has a base body having a holder or receptacle for the component and a suction device for retaining the component held in the holder at the defined location. In addition, the mounting device contains a pressing device to press the component held in the holder or receptacle to the defined location. A method for the validatable fixation of a component, such as in particular a fixture or bracket, at a defined location is also provided.

27 Claims, 3 Drawing Sheets

(51) Int. Cl.
*A47G 29/08* (2006.01)
*B60R 11/00* (2006.01)

(58) Field of Classification Search
USPC .......................................... 248/683
See application file for complete search history.

(56) References Cited

U.S. PATENT DOCUMENTS

| | | | | |
|---|---|---|---|---|
| 6,413,022 | B1* | 7/2002 | Sarh | B25B 5/006 |
| | | | | 408/97 |
| 7,076,856 | B2* | 7/2006 | Sarh | B25B 11/005 |
| | | | | 29/796 |
| 7,382,119 | B1* | 6/2008 | Gasque, Jr. | G01V 3/081 |
| | | | | 324/67 |
| 8,413,307 | B2* | 4/2013 | Katzenberger | B23B 49/026 |
| | | | | 408/239 R |
| 2003/0034601 | A1* | 2/2003 | Kloepfer | B25B 11/007 |
| | | | | 269/21 |
| 2003/0201593 | A1* | 10/2003 | Schmalz | B25B 11/005 |
| | | | | 269/329 |
| 2005/0257346 | A1* | 11/2005 | Roth | A47K 17/022 |
| | | | | 16/436 |
| 2010/0283194 | A1* | 11/2010 | Han | B25B 11/005 |
| | | | | 269/21 |
| 2018/0251990 | A1* | 9/2018 | Sasaki | B05C 21/00 |
| 2020/0016307 | A1* | 1/2020 | Edelman | A61M 1/06935 |

FOREIGN PATENT DOCUMENTS

| | | |
|---|---|---|
| DE | 202011106596 U1 | 11/2011 |
| DE | 202013011224 U1 | 2/2014 |
| WO | 2012059755 A1 | 5/2012 |

* cited by examiner

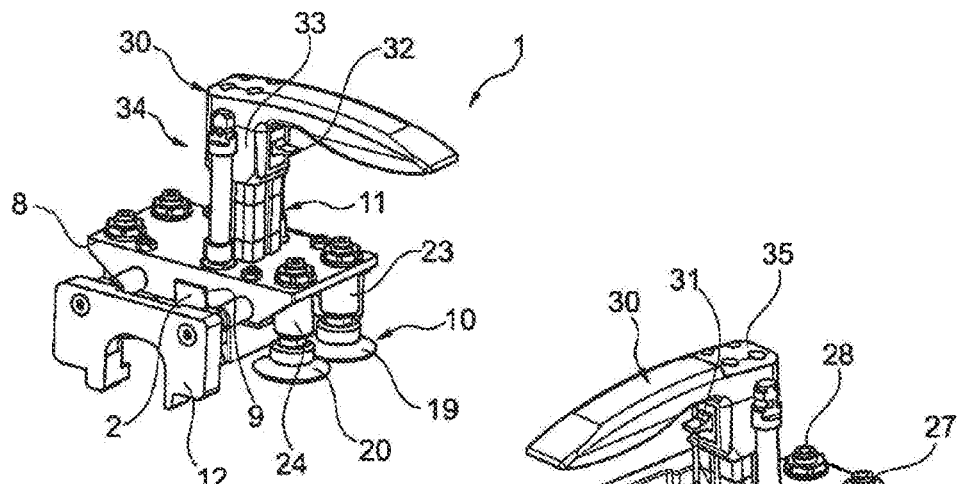
Fig. 1
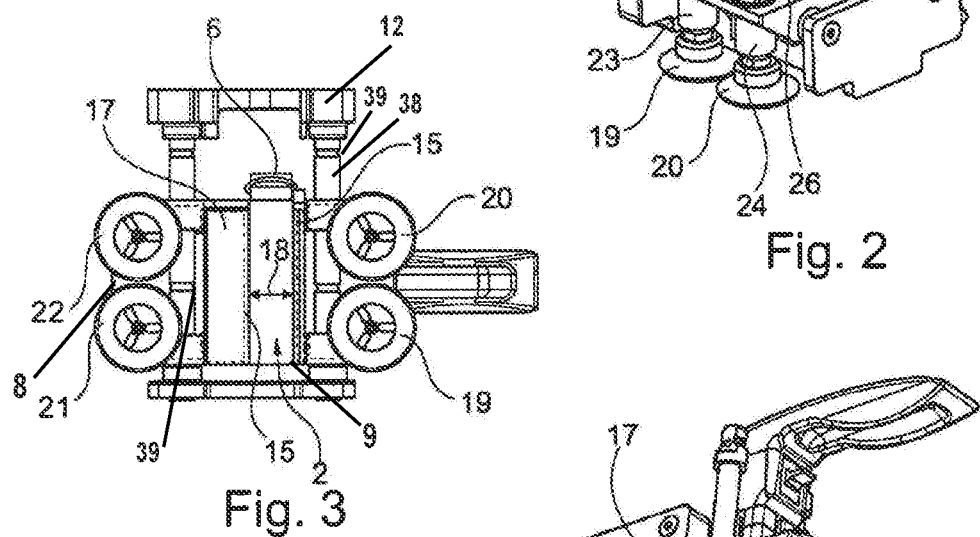
Fig. 2
Fig. 3
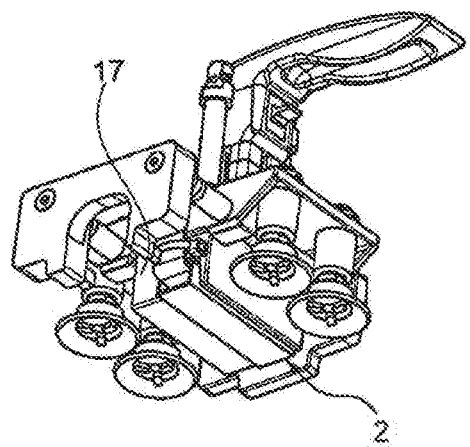
Fig. 4

MOUNTING DEVICE AND METHOD FOR VALIDATABLE FIXING

CROSS REFERENCE TO RELATED APPLICATIONS

This application is the U.S. national stage of PCT/DE2019/000175 filed Jul. 4, 2019, which claims priority of German patent application 102018005743.8 filed Jul. 23, 2018, both of which are hereby incorporated by reference in their entirety.

FIELD OF THE INVENTION

The invention relates to a mounting device for fastening a component, such as in particular a fixture or bracket, at a defined location.

BACKGROUND OF THE INVENTION

To transport products in a packaging, it is often necessary to keep the product in the package so that it cannot slip. For this purpose, inserts are known, which often consist of a foam or cardboard and are adapted to the product in such a way that a product placed in the packaging is held within the packaging in such a way that it cannot slip.

It is also known to stick lashing eyes/lugs and straps to the interior of a container, e.g. the interior of a blister pack, in order to hold the product in the blister pack in a precise position.

Such solutions are either material-intensive or labour-intensive when it comes to placing the holding devices inside the packaging and the secure positioning and holding of the product in the packaging.

SUMMARY OF THE INVENTION

The invention is therefore based on the object of providing a mounting device with which, individually and reproducibly and optionally, differently shaped components can be securely held in a packaging.

This object is solved by a mounting device as described herein.

The object is also solved with a method for the validatable fastening of a component, such as in particular a fixture or bracket at a defined location, with the characteristics described herein.

Advantageous further embodiments are also described.

The seating or receptacle ensures that the component, in particular a fixture or bracket, can be held precisely in a defined position relative to the base body. The suction device enables to hold the base body with the seating at a defined location. This is usually a predetermined position within a package. Finally, the pressing device enables to press the component held in the seating to the defined location in order to hold the component there in a positive or non-positive manner and, in particular, to bond it.

The mounting device thus enables the user to easily and precisely position, for example, a fixture or bracket at a specific location and to fasten it there. Especially for the transport of easily damageable products within an outer packaging, the mounting device facilitates the holding of the product within the packaging, for example with mounting straps that are arranged and tensioned in a defined manner within the packaging. This ensures that the products are not damaged during transport, even if the packaging is not handled properly.

The mounting device can be used to attach components at any location. However, it is advantageous, if the defined location is within a cavity of a packaging. Even if access is difficult within a packaging, the mounting device enables the defined placement of fixtures or brackets.

In order to be able to arrange the base body and thus also the component held in the seating or the receptacle of the base body in a defined position relative to a wall, for example of a packaging or blister pack, it is suggested that at least one height stop is arranged on the base body. This height stop can be a rod that is slideable relative to the base body, which can preferably be precisely adjusted and fixed in its position relative to the base body by means of a scale provided on the rod or on the base body. This enables to feel, by means of the stop and when manually operating the mounting device, whether the base body and thus also the component is positioned at the defined location.

In particular when specific distances of the height stop relative to the base body are used repeatedly, it is advantageous, if the height stop has a catch or notch to define at least one detent position of the height stop relative to the base body. Preferably, the height stop has multiple detent positions spaced apart to facilitate the positioning of the base body within a packaging.

In order to fasten the component at a defined location, it is particularly advantageous in case of an attachment by means of an adhesive, if the seating or receptacle has a pressure element to hold the component in the seating or receptacle with a defined force. This results in the component being held securely in the seating or receptacle, but it can be removed from the seating or receptacle, when a defined release force is applied, such as in particular a pull on the component. The component can thus, for example, be held in the seating or receptacle and be guided, together with the base body, to the defined location and held there until an adhesive between the component and the defined location sets or cures, so that the component remains at the defined location, when the base body with the seating or receptacle is pulled off from the component. An interference fit or press fit can, for example, serve as a retaining element for holding the component in the seating or receptacle with a defined force. However, e.g., a flexibly mounted pressure element or a spring mechanism, such as a ball thrust piece, in the component seating or receptacle, is advantageous for holding the component in the seating or receptacle.

In or alternatively, it is suggested that the seating or receptacle has a suction element to hold the component in the seating or receptacle with a defined force. The suction element can be a passive suction element, such as a suction cup, and it can also be an active suction element, such as a suction device that can be connected to low pressure conditions.

In particular for the use of differently shaped components or components of different sizes, it is advantageous, if the seating or receptacle has a seating area whose dimensions can be adjusted, preferably by means of catching. If, for example, the height, width and/or depth of the seating or receptacle can be adjusted, this facilitates adjustment to different components. A scale can be provided for the dimensioning of the holder area.

The mounting device can be connected to a robot or an electronic positioning device. For manual positioning of components, however, it is particularly advantageous, if the device is designed as light as possible. Therefore, it is suggested that the seating or receptacle and/or the base body are made of plastic or aluminium. A suitable material for the seating or receptacle is also, for example, polyoxymethylene.

The suction device, which serves to hold the component held in the seating or receptacle at the defined location, can be any suction cup. However, it is advantageous, if this suction device has at least one flat vacuum suction cup.

It is particularly advantageous, if the suction device has multiple flat vacuum suction cups, whose position relative to the base body can be adjusted in defined positions, preferably in a catching manner. This enables adjustment to different surface geometries by positioning the suction device relative to the base body at a defined height, width and/or depth.

In particular for the attachment of a component within a packaging which is difficult to access, it is advantageous, if the suction device has a flat vacuum suction cup, which is connected to the base body via a joint. Preferably, the suction device has multiple corresponding joints with flat vacuum suction cups.

Such a suction device can be operated hydraulically or mechanically. However, it is particularly advantageous, if the suction and/or pressing device can be operated pneumatically. This is typically realised by means of a pneumatic pressure cylinder. The suction and/or pressing device is preferably connected to a connection point for at least one suction and/or pressure line.

In order to be able to run the operations on the mounting device under electronic control, it is suggested that the mounting device has a controller. This enables, for example, that the suction and/or pressing device are in communication with the controller in order to automatically adjust the pressure and/or duration. Particularly in the case of an adhesive connection, this can ensure that the component is held in place at the defined location for a sufficiently long time and, in particular, with sufficient pressure, so that the adhesive connection is sufficiently strong before the seating or receptacle is pulled off the component.

It is advantageous, if the mounting device has at least one trigger device that is connected to the controller. In this manner, the individual processes can be triggered one after the other or multiple processes, and in particular all processes, for fastening the component at the defined location can be started by the trigger device. For example, with a trigger guard, a lever, a pistol trigger or a foot switch, the entire process or also partial steps can be activated via the controller.

A particularly advantageous embodiment provides that the trigger device has a contact switch. This allows, for example, to start the process via a sensor or via a mechanical trigger, when the component is pressed against a surface at the defined location.

In particular if the base body is connected to a supply area, for example via electrical and/or pneumatic lines, the controller can be arranged at the supply area. However, it is advantageous, if the controller forms a mobile unit with the base body. This allows the controller to trigger and monitor the process steps directly at the base body.

Irrespective of the controller's arrangement, it is advantageous, if the controller has a display. On said display the currently still required holding time or the current process step may be indicated.

In order to make the mounting device as light and mobile as possible, it is suggested that the mounting device has only one pressure line as supply line for the suction device and the pressing device. This pressure line can constitute an overpressure or a negative pressure in order to provide, via a valve control, the suction pressure for the suction device and, optionally, also an overpressure.

Mobility can also be improved by connecting the suction device and/or the pressing device to a portable pressure vessel. This pressure vessel can also be fixedly attached to the base body to provide a compact mobile unit.

The component can already be provided with an adhesive, which is, for example, activated by peeling off a film. However, the mounting device can also have an applicator device to apply an adhesive to the component or the defined location.

For this purpose, it is suggested that the applicator device be equipped with a distribution mechanism, such as a nozzle, a spatula or a pressing surface, in order to apply the adhesive either as a defined bead or over a large area or in a planar manner.

For the application of an adhesive, it is advantageous, if the applicator device is arranged next to the seating or receptacle.

The applicator device can be operated hydraulically for the transport of an adhesive as a bead or, in particular for a spray application, also pneumatically.

The mounting device may have a handle to allow manual operation in a simple manner. This handle may also have triggering devices and/or switches to activate individual process steps or the entire sequence.

A particularly compact design of the mounting device provides that it is designed as a mobile portable unit with a pressure generator. The energy for the pressure generator can be provided via a power supply line or via an overpressure or negative pressure line.

A further increase in mobility may be achieved by configuring the mounting device as a mobile portable unit with a mobile power supply, such as a battery or an accumulator.

In view of the process, it is particularly advantageous, if the base body is first fixed in place using the suction device, then the seating or receptacle with the component is moved to the defined location with a pneumatic device, then the seating or receptacle is pulled off the component, after a defined time the pressure of the pressing device on the component is released and then the suction pressure of the suction device is released.

It is particularly advantageous, if the suction pressure of the suction device is automatically released in a time-controlled manner. Alternatively, the suction pressure can also be deactivated manually.

It is advantageous, if the suction pressure of the suction device is at least strong enough to hold the base body at the defined location even at maximum pressure of the pressing device. By adjusting the pressures on the suction device and the pressing device, contact pressure and contact time can be set in a defined manner. This is preferably done via a controller.

In order to ensure that the component is also fastened in the correct location, it is suggested that the base body is positioned at the defined location by means of a height stop. This particularly facilitates manual operation.

BRIEF DESCRIPTION OF THE DRAWINGS

The mounting device and the inventive method are described in more detail below using an exemplary embodiment. It shows FIG. 1 is a perspective view of a mounting device;

FIG. 2 is another perspective view of the mounting device shown in FIG. 1;

FIG. 3 is a bottom side view of the mounting device shown in FIG. 1;

FIG. 4 is a side view from below of the mounting device shown in FIG. 1;

DETAILED DESCRIPTION OF PREFERRED EMBODIMENT

Figure 5:
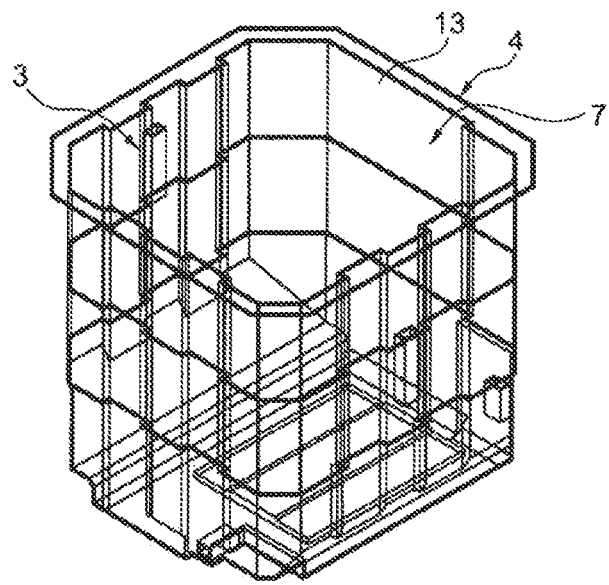
FIG. 5 is a perspective view of a transparent blister pack with several components attached to its interior.

FIGS. 1 to 4 show a mounting device 1 for fastening a component 2 at a defined location 3 of a packaging 4. Component 2 is a fixture or bracket 5, which is configured as a square tube and in which a belt or strap 6 can be arranged.

The packaging 4 shown in FIG. 5 is a blister pack with a cavity 7 in which products can be transported that must be fixed in the packaging 4 during transport. For this purpose, lashing eyes/lugs and Velcro strips can be used as a component 5. These components are reproducibly and securely fastened to the inner wall in the cavity 7 of the packaging 4 with the mounting device 1.

For this purpose, the mounting device 1 has a base body 8 with a seating or receptacle 9 for the component 2.

A suction device 10 serves to hold the component 2 held in the seating or receptacle 9 with the entire mounting device 1 at the defined location 3 of the packaging 4.

A pressing device 11 serves to press the component 2 held in the seating or receptacle 9 to the defined location 3.

In order to be able to arrange the base body 8 and thus also the component 2 held in the seating or the receptacle 9 of the base body 8 in a defined position relative to a wall, for example of a packaging or blister pack, it is suggested that at least one height stop 12 is arranged on the base body. As shown in FIG. 3, this height stop 12 may include a rod 38 that is slideable relative to the base body 8, which can preferably be precisely adjusted and fixed in its position relative to the base body by means of a scale provided on the rod or on the base body. This enables to feel, by means of the stop 12 and when manually operating the mounting device, whether the base body and thus also the component is positioned at the defined location.

In particular when specific distances of the height stop 12 relative to the base body 8 are used repeatedly, it is advantageous, if the height stop 12 has a catch or notch 39 to define at least one detent position of the height stop 12 relative to the base body 8. Preferably, the height stop 12 has multiple detent positions 39 spaced apart to facilitate the positioning of the base body within a packaging.

Figure 7:
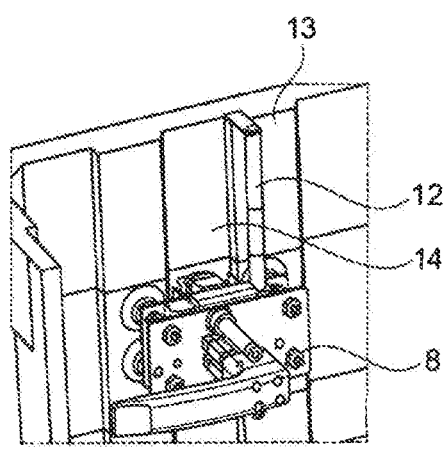
FIG. 7 is a partial view of the mounting device shown in FIG. 1 with a spacer on a blister pack.
Figure 8:
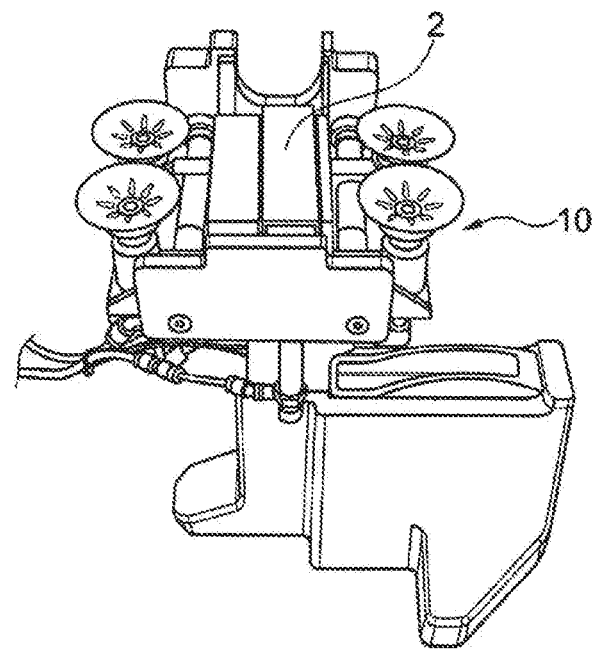
FIG. 8 is a top view of the bottom side of a mounting device with connecting lines.

FIG. 7 shows that the base body 8 has a height stop 12. This allows to position the base body 8 by hooking the height stop 12 to an upper edge 13 of the packaging 4, which makes it easy to position the base body 8 at a defined distance from the edge 13.

In order to vary the position of the base body 8 to the upper edge 13, the height stop 12 has a catch 14, so that a position of the height stop 12 relative to the base body 8 can be defined.

The component 2 must be held in the seating or receptacle 9 to guide it to the defined location 3 on the packaging 4, and it must be detachable from the base body 8 to remain adhered to the packaging 4, when the mounting device 1 is detached from the packaging 4. For this purpose, the seating or receptacle 9 comprises a pressure element 15, which is configured as a fitting to hold the component 2 with a defined force in the seating or receptacle 9.

In addition, a suction element 16 is provided, which holds component 2 in holder 9 with a suction force.

The width of the holder 9 can be adjusted by means of a sliding element which is arranged in a catching manner at the base body 1, so that the width of a holding area 18 for component 2 can be adjusted.

Since the entire mounting device should be stable and easy to handle, its individual parts are essentially made of plastic or aluminium.

The suction device 10 consists of four flat vacuum suction cups 19, 20, 21 and 22, whose position relative to the base body 8 can be adjusted in defined positions by means of spacers 23 and 24.

The entire suction device 10 or the individual flat vacuum suction cups 19, 20, 21 and 22 can also be connected to the base body 8 via a joint (not shown).

The flat vacuum suction cups 19, 20, 21 and 22 each have pneumatic connections 25, 26, 27 and 28, which are connected to a negative pressure device (not shown) via lines 29. This means that the suction device can be operated pneumatically.

The base body 8 of the mounting device 1 has a handle 30 in which a controller 31 is arranged, which is in connection with the suction device 10 and the pressing device 11 to adjust pressure and duration at the suction device and the pressing device.

A contact switch 32 is used to activate a trigger device 33, which is connected to the controller 31. Thereby it is achieved that the controller 31 and the base body 8 form a mobile unit 34, which is connected to pneumatic devices (not shown) via the line 29 and is easily portable, e.g. in the cavity 7 of a packaging 4, and can be easily positioned at a defined location.

A display 35 shows on the handle 30 the status of the mounting device 1 set by the controller 31.

Figure 9:
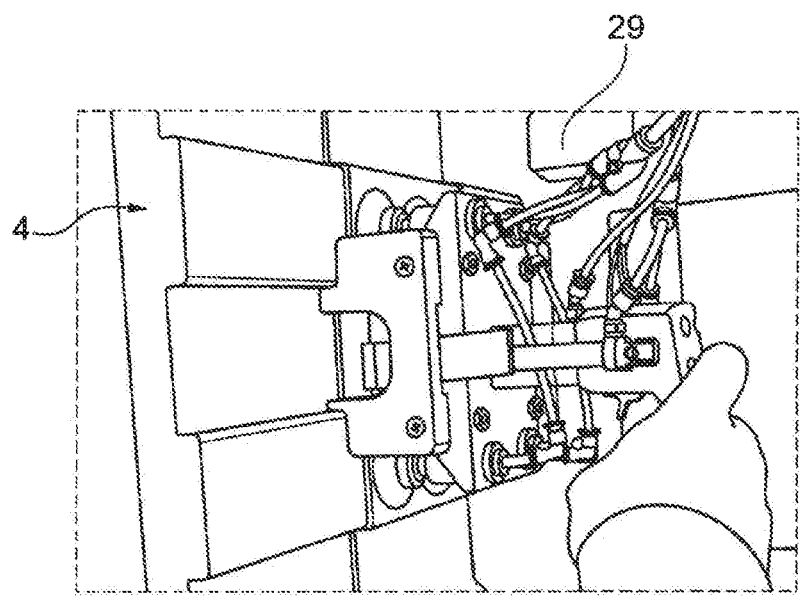
FIG. 9 is a view of a mounting device with connecting lines on a blister pack.

In the embodiment shown in FIG. 9, the mounting device is connected to a pneumatic device via several pressure lines. According to an embodiment not shown, the suction device 10 and the pressing device 11 are connected to a pneumatic device only via a single pressure line as supply line.

An embodiment, which is also not shown, provides that the suction device 10 and/or the pressing device 11 are connected to a portable pressure vessel (not shown).

Figure 6:
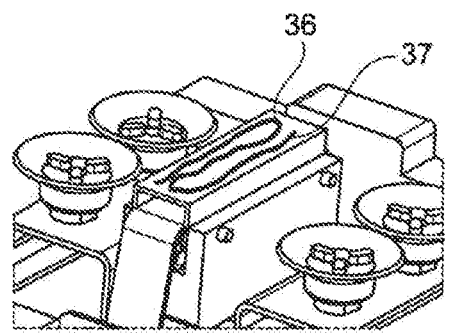
FIG. 6 is a bottom side of the mounting device shown in FIG. 1 with an adhesive on a component.

In the embodiment shown according to FIG. 6, an adhesive 36 is applied to component 2 as a line 37. However, the adhesive 36 can also be sprayed on or component 2 may already comprise an adhesive surface. In an embodiment not shown, an applicator device (not shown) is provided to apply the adhesive 36 to component 2 or the defined location 3. This applicator device can then be connected to the controller 31 to automatically adjust the pressure or duration of the adhesive application. This applicator device can be equipped with a nozzle (not shown) as a distribution mechanism and can, for example, be arranged next to or adjacent the seating or receptacle 9.

It is advantageous, if this applicator device can be operated pneumatically.

When using such a mounting device 1, the component 2 is first positioned and held in the seating or receptacle 9. Then, an adhesive 36 is applied to the component 2. Then, the base body 8 is positioned with component 2 at the defined location 3 and held precisely in place by means of the suction device. Then, the seating or receptacle 9 with component 2 is moved relative to the base body to the defined location 3. Subsequently, the component 2 located in the holder 9 is moved by means of a pneumatic device (not shown) relative to the base body to the defined location 3, so that the adhesive touches the packaging 4. Then, the seating or receptacle 9 is pulled off the component 2 and the base body 8 is removed from the component 2.

The suction device 10 enables to fix the base body 8 at location 3 and the pressing device 11 enables to press the component 2 to location 3 until the adhesive 36 sets or cures. After the seating or receptacle 9 has already been pulled off the component 2, the pressure of the pressing device 11 on the component can be released after a defined time period and as a final step the suction pressure of the suction device 10 is released.

The entire process can be automatically controlled by the controller 31. Preferably, care is taken to ensure that the suction pressure of the suction device 10 is at least strong enough to keep the base body 8 at the defined location, even at maximum pressure of the pressing device 11.

The invention claimed is:

1. A mounting device for fastening a component, at a defined location in an interior of a packaging, comprising:
    a base body having a seating or receptacle for the component;
    a suction device operable to hold the base body to a wall of the packaging such that the component in the seating or receptacle is positioned at the defined location;
    a height stop arranged on the base body for positioning the base body on the wall such that the component is positioned at the defined location, the height stop being movable relative to the base body and having at least one catch or notch to define a detent position of the height stop relative to the base body; and
    a pressing device operable to press the component in the seating or receptacle to the wall of the packaging at the defined location.

2. The mounting device according to claim 1, wherein the defined location is within a cavity of a packaging.

3. The mounting device according to claim 1, wherein the seating or receptacle has a pressure element for gripping the component in the seating or receptacle with a defined force.

4. The mounting device according to claim 1, wherein the seating or receptacle has a seating area, a dimension of which is adjustable.

5. The mounting device according to claim 1, wherein the seating or receptacle and/or the base body are made of plastic or aluminum.

6. The mounting device according to claim 1, wherein the suction device comprises at least one flat vacuum suction cup.

7. The mounting device according to claim 1, wherein the suction device comprises several flat vacuum suction cups, a position of which relative to the base body can be adjusted, in defined positions.

8. The mounting device according to claim 6, wherein the suction device comprises a flat vacuum suction cup which is connected to the base body via a joint.

9. The mounting device according to claim 1, wherein the suction device and/or the pressing device are pneumatically operable.

10. The mounting device according to claim 1, further comprising a controller.

11. The mounting device according to claim 10, wherein the suction device and/or the pressing device are in communication with the controller for automatically adjusting pressure and/or time duration.

12. The mounting device according to claim 10, further comprising at least one trigger device communicating with the controller.

13. The mounting device according to claim 12, wherein the trigger device comprises a contact switch.

14. The mounting device according to claim 10, wherein the controller forms a mobile unit with the base body.

15. The mounting device according to claim 10, wherein the controller has a display.

16. The mounting device according to claim 1, further comprising a handle.

17. The mounting device according to claim 1, wherein the mounting device is configured as a mobile portable unit with a pressure generator.

18. The mounting device according to claim 1, wherein the mounting device is configured as a mobile portable unit with a mobile power supply, a battery or an accumulator.

19. A method for validatable fixing of a component at a defined location, comprising:
    providing a mounting device for fastening the component, at the defined location in an interior of a packaging, comprising:
        a base body having a seating or receptacle for the component;
        a suction device operable to hold the base body to a wall of the packaging such that the component in the seating or receptacle is positioned at the defined location;
        a height stop arranged on the base body for positioning the base body on the wall such that the component is positioned at the defined location, the height stop being movable relative to the base body and having at least one catch or notch to define a detent position of the height stop relative to the base body; and
        a pressing device operable to press the component in the seating or receptacle to the wall of the packaging at the defined location;
    inserting the component into the seating or receptacle in the base body;
    applying an adhesive to the component before or after the insertion of the component,
    positioning the base body at the defined location by the height stop arranged on the base body such that the component is positioned at the defined location;
    holding the base body at the location by the suction device in such a way that the component is fixed at a distance from the defined location;
    moving the seating or receptacle with the component, fixture or bracket relative to the base body to the defined location by a pneumatic device;
    pulling the seating or receptacle off the component; and
    removing the base body from the component.

20. The method according to claim 19, wherein:
    the step of positioning the base body at the location by the suction device is performed; then
    the step of moving the seating or receptacle with the component to the defined location by the pneumatic device is performed; then
    a step of pressing the component to the location with the pressing device is performed; then the step of pulling the seating or receptacle off the component is performed; and after a defined time period, a pressure of the pressing device on the component is released and then a suction pressure of the suction device is released.

21. The method according to claim 20, wherein the suction pressure of the suction device is automatically released in a time-controlled manner.

22. The method according to claim 20, wherein the suction pressure of the suction device is at least so strong that it holds the base body at the defined location even at maximum pressure of the pressing device.

23. The mounting device according to claim 1, wherein the height stop has multiple detent positions relative to the base body.

24. The mounting device according to claim 1, wherein the height stop comprises a rod with the catch or notch defined in the rod.

25. The mounting device according to claim 24, wherein the rod has multiple detent positions relative to the base body.

26. The mounting device according to claim 24, wherein the packaging is a blister pack.

27. The mounting device according to claim 3, wherein the pressure element is flexibly mounted or is a spring mechanism operable to grip the component with the defined force.

* * * * *